US012354427B2

(12) United States Patent
Kim et al.

(10) Patent No.: US 12,354,427 B2
(45) Date of Patent: Jul. 8, 2025

(54) METHOD AND SYSTEM FOR USER-CENTERED VISITOR ACCESS MANAGEMENT

(71) Applicant: ELECTRONICS AND TELECOMMUNICATIONS RESEARCH INSTITUTE, Daejeon (KR)

(72) Inventors: Seok-Hyun Kim, Daejeon (KR); Young-Seob Cho, Daejeon (KR); Soo-Hyung Kim, Daejeon (KR); Geon-Woo Kim, Daejeon (KR); Young-Sam Kim, Daejeon (KR); Jong-Hyouk Noh, Daejeon (KR); Kwan-Tae Cho, Daejeon (KR); Sang-Rae Cho, Chungcheongbuk-do (KR); Jin-Man Cho, Daejeon (KR); Seung-Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 203 days.

(21) Appl. No.: 18/188,408

(22) Filed: Mar. 22, 2023

(65) Prior Publication Data

US 2024/0104990 A1 Mar. 28, 2024

(30) Foreign Application Priority Data

Sep. 23, 2022 (KR) ........................ 10-2022-0120685

(51) Int. Cl.
*G07C 9/38* (2020.01)
*G07C 9/32* (2020.01)

(52) U.S. Cl.
CPC ................. *G07C 9/38* (2020.01); *G07C 9/32* (2020.01)

(58) Field of Classification Search
CPC ... G07C 9/38; G07C 9/32; G07C 9/27; G07C 2009/00769; G07C 9/00309;
(Continued)

(56) References Cited

U.S. PATENT DOCUMENTS 8,112,506 B2 2/2012 Son et al.
8,752,133 B2 6/2014 An
(Continued)

FOREIGN PATENT DOCUMENTS

KR 101223899 B1 1/2013
KR 101233922 B1 2/2013
(Continued)

*Primary Examiner* — Nam V Nguyen
(74) *Attorney, Agent, or Firm* — Rabin & Berdo, P.C.

(57) ABSTRACT

Disclosed herein is a method for user-centered visitor access management, which may include issuing, by a management office server, a digital certificate to a householder terminal; registering, by a wall-pad, a householder in response to a request to register the householder based on the digital certificate; requesting, by the householder terminal, the management office server to register a visitor based on a visit request from a visitor terminal and delegating the digital certificate to the visitor terminal; making an entry request to a management terminal based on the digital certificate; verifying, by the wall-pad, the digital certificate based on a request for verification for entry from a wall-pad management terminal and providing a verification result to the wall-pad management terminal when the management terminal is the wall-pad management terminal; and managing and controlling, by the wall-pad, permission to use home devices based on delegated permission information of the digital certificate.

18 Claims, 12 Drawing Sheets

(58) Field of Classification Search
CPC .. G07C 9/00571; G07C 9/00896; G07C 9/29; H04W 4/80
USPC .................................................... 340/5.2, 5.7
See application file for complete search history.

(56) References Cited

U.S. PATENT DOCUMENTS

| | | | | |
|---|---|---|---|---|
| 9,626,859 | B2 * | 4/2017 | Ribas | G08C 17/02 |
| 10,134,212 | B1 * | 11/2018 | Ren | G07C 9/00896 |
| 10,679,439 | B2 * | 6/2020 | Han | G07C 9/00174 |
| 10,769,873 | B1 * | 9/2020 | Sun | H04L 9/3247 |
| 11,574,513 | B2 * | 2/2023 | Kirkjan | G07C 9/00817 |
| 11,617,053 | B2 * | 3/2023 | Wedzikowski | H04W 4/021 187/380 |
| 11,721,148 | B2 * | 8/2023 | Omori | E05B 49/00 340/5.64 |
| 11,792,181 | B2 * | 10/2023 | Hamel | H04L 9/3239 |
| 2015/0221152 | A1 * | 8/2015 | Andersen | G07C 9/27 340/5.22 |
| 2015/0235496 | A1 * | 8/2015 | Vecchiotti | H04W 84/12 340/5.61 |
| 2017/0352207 | A1 * | 12/2017 | Siklosi | G07C 9/27 |

FOREIGN PATENT DOCUMENTS

| | | | |
|---|---|---|---|
| KR | 101554959 | B1 | 9/2015 |
| KR | 20210116909 | A | 9/2021 |

* cited by examiner

```
{
  "@context": [
    "https://www.w3.org/ns/did/v1",
    "https://w3id.org/security/suites/ed25519-2020/v1"
  ],
  "id": "did:example:aptoffice-dk38fj3jf890djdj12dz",
  "authentication": [
    {
     "id": "did:example:aptoffice-dk38fj3jf890djdj12dz#keys-1",
     "type": "Ed25519VerificationKey2020",
     "controller": "did:example:aptoffice-dk38fj3jf890djdj12dz",
     "publicKeyMultibase": "zH3C2AVvLMv6gmMNam3uVAjZpfkcJCwDwnZn6z3wXmqPV"
   }
  ],
  "service": [{
    "id":"did:example:123456789abcdefghi#BLE-1",
    "type": "CommonFrontDoor",
    "serviceEndpoint": "urn:uuid:123e4567-e89b-12d3-a456-426655440000"
   },
   {
    "id":"did:example:123456789abcdefghi#BLE-2",
    "type": "VehicleAccessBlocker",
    "serviceEndpoint": "urn:uuid:456e8952-e89b-12d3-a456-42665544111111"
   }]
}
```

FIG. 2

```
{
  "@context": [
    "https://www.w3.org/2018/credentials/v1",
    "https://www.w3.org/2018/credentials/examples/v1"
  ],
  "id": "https://apt.co.kr/credentials/householder/7",
  "type": ["VerifiableCredential","HouseholderCredential"],
  "issuer": "did:ezid:aptoffice-dk38fj3jf890djdj12dz",
  "issuanceDate": "2021-05-30T10:50:24Z",
  "expirationDate": "2100-12-31T00:00:00Z",
  "credentialSubject": {
      "id": "did:ezid:householder-fi58rut710eudj475h7",
      "type": "HouseholderInfo",
      "claims": {
              "address": "218, GAJEONG-RO, YUSEONG-GU, DAEJEON",
              "addressDetail": "101-1301"
       }
  },
  "credentialStatus": {
    "id": "https://service.aptoffice.com/vcStatus",
    "type": "CredentialStatusList"
  },

  "proof": { ... ... } // the proof generated by the issuer
}
```

FIG. 3

```
{
  "@context": [
    "https://www.w3.org/2018/credentials/v1",
    "https://www.w3.org/2018/credentials/examples/v1"
  ],
  "id": "http://householder.co.kr/credentionals/guest/1",
  "type": ["VerifiableCredential", "DelegationCredential"],
  "issuer": "did:ezid:householder-fi58rut710eudj475h7",
  "issuanceDate": "2022-06-10T15:51:00Z",
  "expirationDate": "2025-12-31T00:00:00Z",
  "credentialSubject": {
    "id": "did:guest:kfi58rut710eudj475h7",
    "type": "TemporaryPassCredential",
    "claims": {
          "maxDelegationDegree": "1",
          "currentDelegationDegree": "1",
          "delegateeInfo": {
            "id": "did:guest:kfi58rut710eudj475h7"
          },
          "delegatingInfo": {
            "type": "GuestInvitation",
            "referenceCredential": {
              "id": "https://apt.co.kr/credentials/householder/7"
            },
            "checkInTime": "2022-06-16T15:51:00Z",
            "checkOutTime": "2022-06-16T18:51:00Z",
            "homeDevices": [{"id": "FrontDoor", "permission":[{"id":"enter", "isAccept":true}]},
                        {"id":"TV", "permission":[{"id":"paidChannel", "isAccept":true}]}]
          }
      }
  },
  "credentialStatus": {
    "id": "https://www.serivce.householder.co.kr/vcStatus",
    "type": "CredentialStatusList"
  },
  "proof": { ... ... } // the proof generated by the issuer
}
```

FIG. 4

METHOD AND SYSTEM FOR USER-CENTERED VISITOR ACCESS MANAGEMENT

CROSS REFERENCE TO RELATED APPLICATION

This application claims the benefit of Korean Patent Application No. 10-2022-0120685, filed Sep. 23, 2022, which is hereby incorporated by reference in its entirety into this application.

BACKGROUND OF THE INVENTION

1. Technical Field

The present disclosure relates to a method and apparatus for user-centered visitor access management using a digital certificate.

2. Description of the Related Art

With the recent development of Internet-of-Things (IoT) technology, various smart services have been launched. Particularly, with the introduction of an IoT system, a smart home service, which enables users to monitor and remotely control the states of various devices (lightning, air conditioning and heating, CCTVs, and the like) in a house using their smartphones, becomes a criterion for luxurious houses.

However, a visitor access management function is still performed in such a way that a resident has to register visit information for a visitor in advance in an apartment complex management office or a visitor has to write the purpose of a visit on the spot. Also, a resident has to open the front door of a household on each visit, and occasionally has to provide a delivery person with a password for opening an entrance door for a delivery service, or the like.

Accordingly, the conventional visitor access management function may cause inconvenience to residents or cause a security problem by exposing information required for access.

SUMMARY OF THE INVENTION

An object of the present disclosure is to provide a method and system for user-centered visitor access management that enables a visitor not only to access the entrance of an apartment complex but also to use various home appliances.

Another object of the present disclosure is to provide a method and system for user-centered visitor access management for improving security in response to a security problem attributable to information exposure.

In order to accomplish the above objects, a method for user-centered visitor access management according to an embodiment may include issuing, by a management office server, a digital certificate to a householder terminal; registering, by a wall-pad, a householder in response to a request to register the householder based on the digital certificate; requesting, by the householder terminal, the management office server to register a visitor in response to a visit request from a visitor terminal and delegating, by the householder terminal, the digital certificate to the visitor terminal; making an entry request to a management terminal based on the digital certificate; when the management terminal is a wall-pad management terminal, verifying, by the wall-pad, the digital certificate in response to a request for verification for entry from the wall-pad management terminal and providing, by the wall-pad, a result of the verification to the wall-pad management terminal; and managing and controlling, by the wall-pad, permission to use a home device based on delegated permission information of the digital certificate.

Issuing the digital certificate may include generating the digital certificate after checking identification of the householder, transmitting the digital certificate to the householder terminal through a communication channel, registering the digital certificate in response to a registration request from the householder terminal, and transmitting a result of registration of the digital certificate to the householder terminal.

The householder terminal may request the management office server to register the digital certificate after verifying the content of the received digital certificate and checking service attribute information, which includes a list of BLE identifier information for management-office management terminals, in a decentralized identifier document of a management office.

The householder terminal may store the digital certificate and management office information based on the result of the registration of the digital certificate.

Making the entry request to the wall-pad management terminal may include checking whether a BLE UUID of the wall-pad management terminal is a BLE UUID of a previously registered facility to visit; establishing a BLE communication channel with the wall-pad management terminal when the BLE UUID of the wall-pad management terminal is the BLE UUID of the previously registered facility to visit; retrieving the digital certificate associated with the BLE UUID of the wall-pad management terminal and generating an entry request form based on the digital certificate; and making the entry request to the wall-pad management terminal based on the entry request form.

The wall-pad management terminal may generate an entry verification request form based on the entry request form and make a request for verification for entry to the wall-pad based on the entry verification request form.

The entry request form may include a verifiable presentation for the digital certificate.

Managing and controlling, by the wall-pad, the permission to use the home device may include checking whether a visitor ID corresponds to the householder or the visitor using the visitor ID, checking whether the digital certificate is the digital certificate delegated by the householder terminal when the visitor ID corresponds to the visitor, and changing a configuration about the permission to use the home device such that the visitor is able to use the home device when the digital certificate is the digital certificate delegated by the householder terminal.

When the management terminal is a management-office management terminal, the management office server may verify the digital certificate in response to a request for verification for entry from the management-office management terminal and provide a result of the verification to the management-office management terminal.

Making the entry request to a management-office management terminal may include checking whether a BLE UUID of the management-office management terminal is a BLE UUID of a previously registered facility to visit; establishing a BLE communication channel with the management-office management terminal when the BLE UUID of the management-office management terminal is the BLE UUID of the previously registered facility to visit; retrieving the digital certificate associated with the BLE UUID of the management-office management terminal and generating an entry request form based on the digital certificate; and making the entry request to the management-office management terminal based on the entry request form.

Also, a system for user-centered visitor access management according to an embodiment may include a management office server for issuing a digital certificate to a householder terminal, a wall-pad for registering a householder in response to a request to register the householder based on the digital certificate, the householder terminal for requesting the management office server to register a visitor in response to a visit request from a visitor terminal and delegating the digital certificate to the visitor terminal, and the visitor terminal for making an entry request to a management terminal based on the digital certificate. When the management terminal is a wall-pad management terminal, the wall-pad may verify the digital certificate in response to a request for verification for entry from the wall-pad management terminal and provide a result of the verification to the wall-pad management terminal.

The management office server may generate the digital certificate after checking identification of the householder, transmit the digital certificate to the householder terminal through a communication channel, register the digital certificate in response to a registration request from the householder terminal, and transmit a result of registration of the digital certificate to the householder terminal.

The householder terminal may request the management office server to register the digital certificate after verifying the content of the received digital certificate and checking service attribute information, which includes a list of BLE identifier information for management-office management terminals, in a decentralized identifier document of a management office.

The householder terminal may store the digital certificate and management office information based on the result of the registration of the digital certificate.

The visitor terminal may check whether a BLE UUID of the wall-pad management terminal is a BLE UUID of a previously registered facility to visit, establish a BLE communication channel with the wall-pad management terminal when the BLE UUID of the wall-pad management terminal is the BLE UUID of the previously registered facility to visit, retrieve the digital certificate associated with the BLE UUID of the wall-pad management terminal, generate an entry request form based on the digital certificate, and make the entry request to the wall-pad management terminal based on the entry request form.

The wall-pad management terminal may generate an entry verification request form based on the entry request form and make a request for verification for entry to the wall-pad based on the entry verification request form.

The entry request form may include a verifiable presentation for the digital certificate.

The wall-pad may check whether a visitor ID corresponds to the householder or the visitor using the visitor ID, check whether the digital certificate is the digital certificate delegated by the householder terminal when the visitor ID corresponds to the visitor, and change a configuration about permission to use a home device such that the visitor is able to use the home device when the digital certificate is the digital certificate delegated by the householder terminal.

When the management terminal is a management-office management terminal, the management office server may verify the digital certificate in response to a request for verification for entry from the management-office management terminal and provide a result of the verification to the management-office management terminal.

The visitor terminal may check whether a BLE UUID of the management-office management terminal is a BLE UUID of a previously registered facility to visit, establish a BLE communication channel with the management-office management terminal when the BLE UUID of the management-office management terminal is the BLE UUID of the previously registered facility to visit, retrieve the digital certificate associated with the BLE UUID of the management-office management terminal, generate an entry request form based on the digital certificate, and make the entry request to the management-office management terminal based on the entry request form.

BRIEF DESCRIPTION OF THE DRAWINGS

The above and other objects, features, and advantages of the present disclosure will be more clearly understood from the following detailed description taken in conjunction with the accompanying drawings, in which:

FIG. 2 is a view illustrating sample data of a decentralized identifier document of a management office according to an embodiment;

FIG. 3 is a view illustrating sample data for a digital certificate that is issued to a householder according to an embodiment;

FIG. 4 is a view illustrating sample data for a digital certificate that is delegated (handed over) to a visitor according to an embodiment;

DESCRIPTION OF THE PREFERRED EMBODIMENTS

Figure 1:
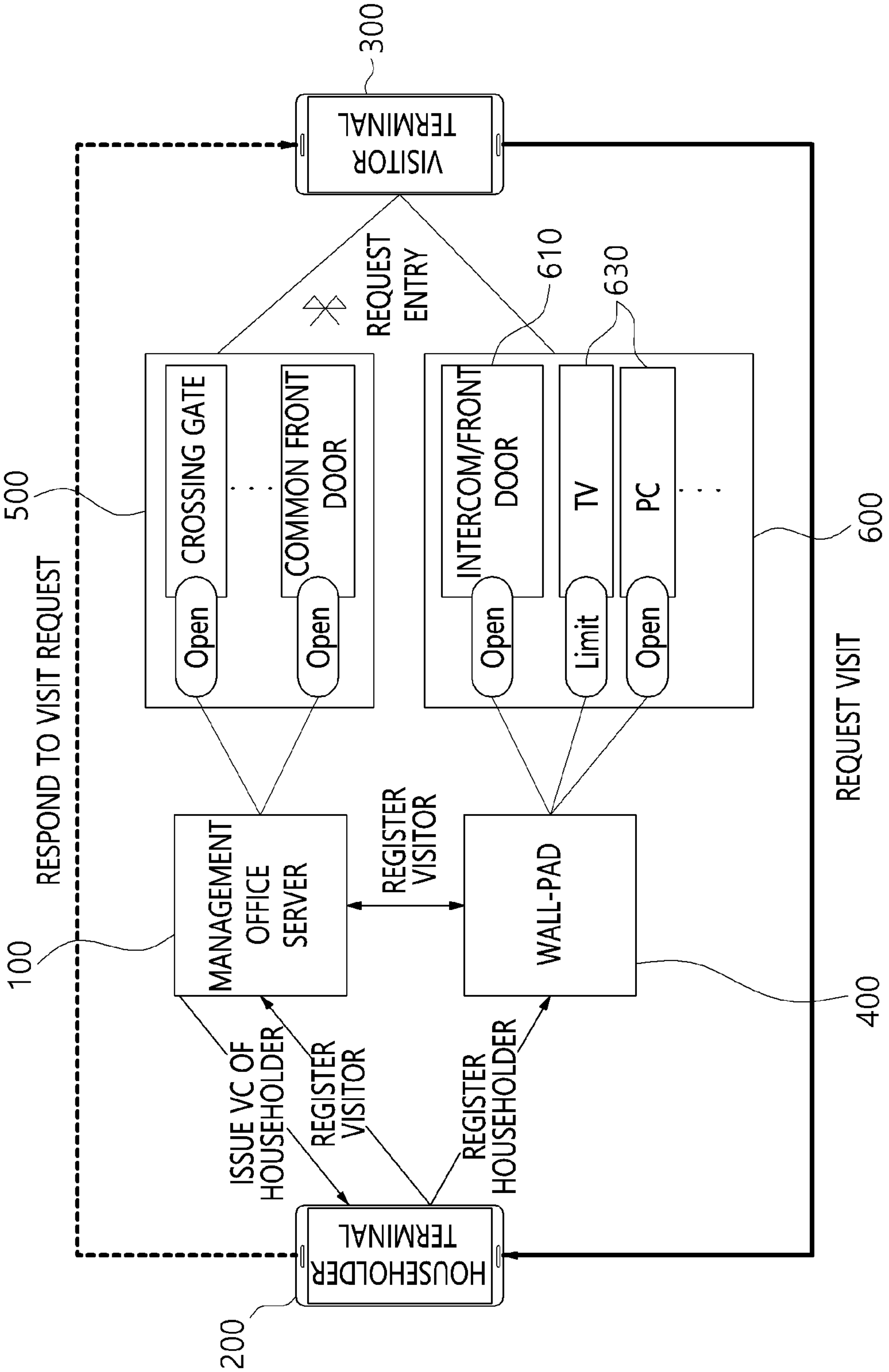
FIG. 1 is a block diagram illustrating a system for user-centered visitor access management according to an embodiment.

The advantages and features of the present disclosure and methods of achieving the same will be apparent from the exemplary embodiments to be described below in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a block diagram illustrating a system for user-centered visitor access management according to an embodiment.

Referring to FIG. 1, the system for user-centered visitor access management according to an embodiment may include a management office server 100, a householder terminal 200, a visitor terminal 300, a wall-pad 400, a management-office management terminal 500, and a wall-pad management terminal 600.

The management office server 100 may issue a digital certificate (a verifiable credential (VC)) to the householder terminal 200. The management office server 100 may register and manage visitor information, the registration of which is requested by a householder. The management office server 100 may manage whether to permit entry of a visitor in response to the access to the management-office management terminal 500. The management office server 100 may register visit information in the wall-pad 400 of the householder, manage the visit information, and announce arrival of a visitor to the wall-pad 400 of the householder.

The householder terminal 200 may be issued with a digital certificate, and may manage the digital certificate. The householder terminal 200 may receive a visit request from the visitor terminal 300 and provide the visitor terminal 300 with a response to the visit request. The householder terminal 200 may request the management office server 100 to register a visitor.

A digital identity wallet (app) may be installed in each of the householder terminal 200 and the visitor terminal 300, and the digital identity wallets may perform all procedures between the householder terminal 200 and the visitor terminal 300 in response to a visit request from a visitor.

Communication between the householder terminal 200 and the visitor terminal 300 may be performed using a communication method provided by the digital identity wallets, may be performed by attaching a message written in a Multipurpose Internet Mail Extensions (MIME) type interpretable by the digital identity wallets to an external communication (e.g., a text message, an SNS, or the like), or may be performed using any of various other methods.

When communication is performed using a text message or an SNS, there is an advantage in terms of service expansion because the visitor access management service is available even when the householder terminal 200 and the visitor terminal 300 use different types of digital identity wallets.

Also, the digital identity wallet may transmit the digital certificate submitted at the time of requesting a visit or the digital certificate issued by a householder to an a common entrance, which is the management-office management terminal 500, or a household entrance (an intercom or the front door of a household), which is the wall-pad management terminal 600, when entering a facility. The digital certificate may be submitted using any of various methods for communication with the common entrance, which is the management-office management terminal 500, or the household entrance (an intercom or the front door of a household), which is the wall-pad management terminal 600, such as a QR code scan and wireless communication (Near-Field Communication (NFC), Bluetooth Low Energy (BLE), Wi-Fi, and the like), and in the present embodiment, a method using BLE will be described as an example of the procedure according to the present disclosure.

The householder terminal 200 may include a computer that can be connected over a network, a portable terminal, a wearable device, and the like, but is not limited thereto.

For example, the computer may include a notebook computer, a desktop, a laptop, and the like in which a web browser is installed. The portable terminal is a wireless communication device ensuring portability and mobility, and may include all kinds of handheld wireless communication devices, such as a Personal Digital Assistant (PDA), a smartphone, and the like based on Long-Term Evolution (LTE), LTE-A, Personal Digital Cellular (PDC), Personal Handyphone System (PHS), Global System for Mobile communications (GSM), International Mobile Telecommunication (IMT), Code-Division Multiple Access (CDMA), W-CDMA, Wireless Broadband Internet (Wibro), mobile Worldwide Interoperability for Microwave Access (mobile WIMAX), and the like.

Also, the wearable device may include an information-processing device that can be directly worn on a human body, e.g., a watch, glasses, an accessory, a dress, shoes, a smart watch, and the like.

The visitor terminal 300 may include a portable terminal or a wearable device carried by a visitor, but the type thereof is not limited.

The visitor terminal 300 may make an entry request to a common entrance, which is the management-office management terminal 500, or a household entrance (an intercom or the front door of a household), which is the wall-pad management terminal 600, using the digital certificate of the visitor or the digital certificate delegated by the householder terminal 200.

The wall-pad 400, which is a kind of smart pad attached to a wall, may manage whether to permit entry into a household by storing and managing visitor information, the registration of which is requested by the management office server 100, and may set permission to use a home device 630 by interpreting the digital certificate that is submitted by the visitor through the visitor terminal 300. That is, the wall-pad 400 may manage and control the permission to use the home device based on the delegated permission information of the digital certificate.

The management-office management terminal 500 may receive a visitor's digital certificate submitted by the visitor terminal 300 or a digital certificate delegated by a householder, request the management office server 100 to perform verification for the entry of the visitor by transferring the received digital certificate thereto, and permit the entry of the visitor depending on the verification result.

When the digital certificate is submitted through BLE communication between the management-office management terminal 500 and the visitor terminal 300, BLE identifier information pertaining to management terminals 500 of the management office may be managed as service attribute information of the DID document of the management office, whereby the convenience of distribution and management of the BLE identifier of the management-office management terminal 500 may be improved.

The management-office management terminal 500 may include a crossing gate, a common front door, and the like, and the type thereof is not limited.

The wall-pad management terminal 600 may receive a visitor's digital certificate submitted by the visitor terminal 300 or a digital certificate delegated by a householder, request the wall-pad 400 to perform verification for the entry of the visitor by transferring the received digital certificate thereto, and permit the entry of the visitor depending on the verification result. Also, the wall-pad 400 may check whether the entry is the entry of a householder or a visitor by interpreting the digital certificate, and may establish a policy related to permission to use the home device 630.

When the digital certificate is submitted through BLE communication between the wall-pad management terminal 600 and the visitor terminal 300, BLE identifier (UUID) information pertaining to wall-pad management terminals 600 may be received as a response to a visit request and managed as service attribute information of the DID document of the wall-pad 400.

The wall-pad management terminal 600 may include an intercom/front door 610 for the entry into a household, and a TV, a PC, and the like, which are home devices 630, but the type thereof is not limited.

FIG. 2 is a view illustrating sample data of a decentralized identifier (DID) document of a management office according to an embodiment.

As illustrated in FIG. 2, the decentralized identifier (DID) document of a management office includes service attribute information of the DID document of the management office, whereby BLE identifier information pertaining to management-office management terminals may be found. Data may be added to or deleted from the DID document of the management office depending on the system configuration.

FIG. 3 is a view illustrating sample data for a digital certificate issued to a householder according to an embodiment.

As illustrated in FIG. 3, a digital certificate may include 'id', 'type', 'address', and 'addressDetail'. Data may be added to or deleted from the digital certificate depending on the system configuration.

FIG. 4 is a view illustrating sample data for a digital certificate delegated to a visitor according to an embodiment.

As illustrated in FIG. 4, a digital certificate delegated to a visitor may include not only delegation information but also information about permission to use a wall-pad management terminal. Data may be added to or deleted from the digital certificate depending on the system configuration.

Referring back to FIG. 1, the operation of a system for user-centered visitor access management according to an embodiment may be configured such that a management office server 100 issues a digital certificate to a householder terminal 200. The householder terminal 200 may register a householder in a wall-pad 400 based on the input by the householder.

A visitor terminal 300 may make a visit request to the householder terminal 200 based on the input by a visitor. The householder terminal 200 may request the management office server 100 to register the visitor based on the input by the householder. The management office server 100 may register the visitor therein and register the visitor in the wall-pad 400 of the householder.

Based on the input by the householder, the householder terminal 200 may respond to the visit request from the visitor terminal 300. Here, the householder terminal 200 may issue a digital certificate delegated to the visitor terminal 300.

Based on the input by the visitor, the visitor terminal 300 may make an entry request to a management-office management terminal 500 using the digital certificate of the visitor or the digital certificate delegated by the householder. The management-office management terminal 500 may request the management office server 100 to verify the digital certificate and determine whether to permit the visit based on the verification result.

Hereinafter, each procedure will be described in more detail.

Figure 5:
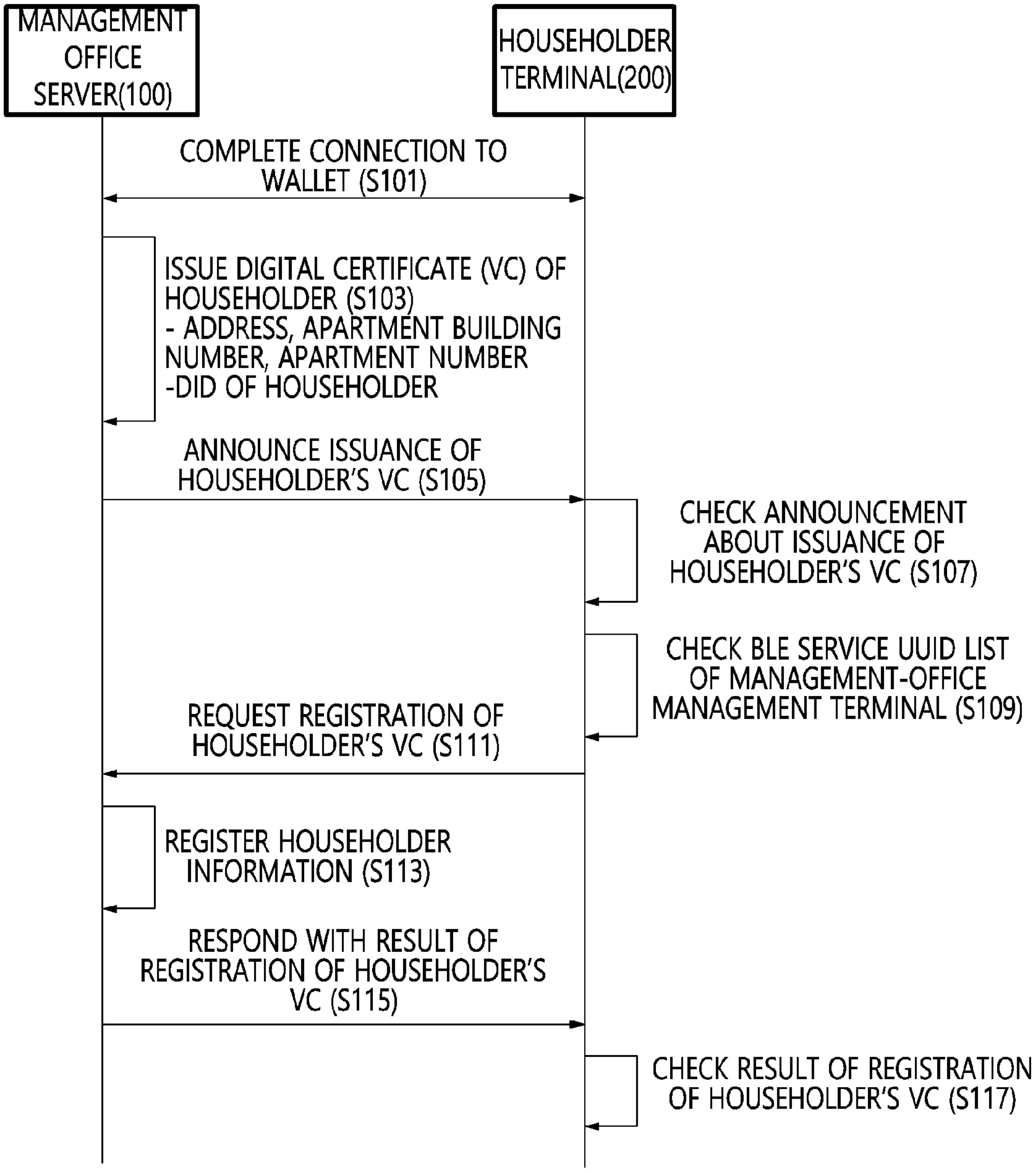
FIG. 5 is a flowchart illustrating a procedure for issuing a digital certificate according to an embodiment.

FIG. 5 is a flowchart illustrating a procedure for issuing a digital certificate according to an embodiment.

As illustrated in FIG. 5, a householder terminal establishes a communication channel between a management office server and the householder terminal (a digital identity wallet) in order to be issued with a digital certificate, thereby completing connection at step S101. Here, the communication channel may be established using any of various communication channel establishment methods, such as a wired or wireless method, a QR code scan method, and the like.

The management office server may check the identification of a householder and issue a digital certificate at step S103. The management office server may announce issuance of the digital certificate at step S105 by transmitting the digital certificate to the householder terminal using the communication channel, and may ask to finally register the digital certificate.

The householder terminal may check the announcement about issuance of the digital certificate at step S107. The householder terminal may verify the content of the digital certificate and check the decentralized identifier (DID) of the management office. Verifying the content may include the process of checking a digital signature for the digital certificate and information about the householder to which the digital certificate is issued.

The householder terminal retrieves the DID document of the management office based on the input by the householder, thereby checking a list of BLE identifiers of management-office management terminals at step S109. The list of the BLE identifiers may be used as information through which the householder terminal is able to identify the management terminal of the management office and to establish a BLE communication channel for submitting the digital certificate.

The householder terminal may request the management office server to finally register the issued digital certificate based on the input by the householder at step S111.

The management office server may register the digital certificate, which is confirmed by the householder, at step S113. Registration may be performed by changing the state information of the digital certificate to a valid state and storing the identifier information of the digital certificate (the ID of a VC) in connection with the DID of the householder.

The management office server may complete the procedure of registering the digital certificate and respond with the result of registration of the digital certificate to the householder terminal at step S115. The response to the registration request may include not only the registration result but also a URL list through which the householder terminal is able to register visitor information in the management office and manage the same. The URL list may include a URL for requesting visitor registration, a URL for requesting visitor cancellation, and the like.

The householder terminal may check the response to the request to register the digital certificate and store the digital certificate and management office information at step S117. When a BLE identifier of a management terminal of the management office matches the stored BLE identifier of the management terminal of the management office, the householder terminal may submit the digital certificate associated with the BLE identifier to the management terminal of the management office and request entry. The management office information may be configured with the DID of the management office and the URLs for visitor registration and cancellation, which are provided by the management office.

Figure 6:
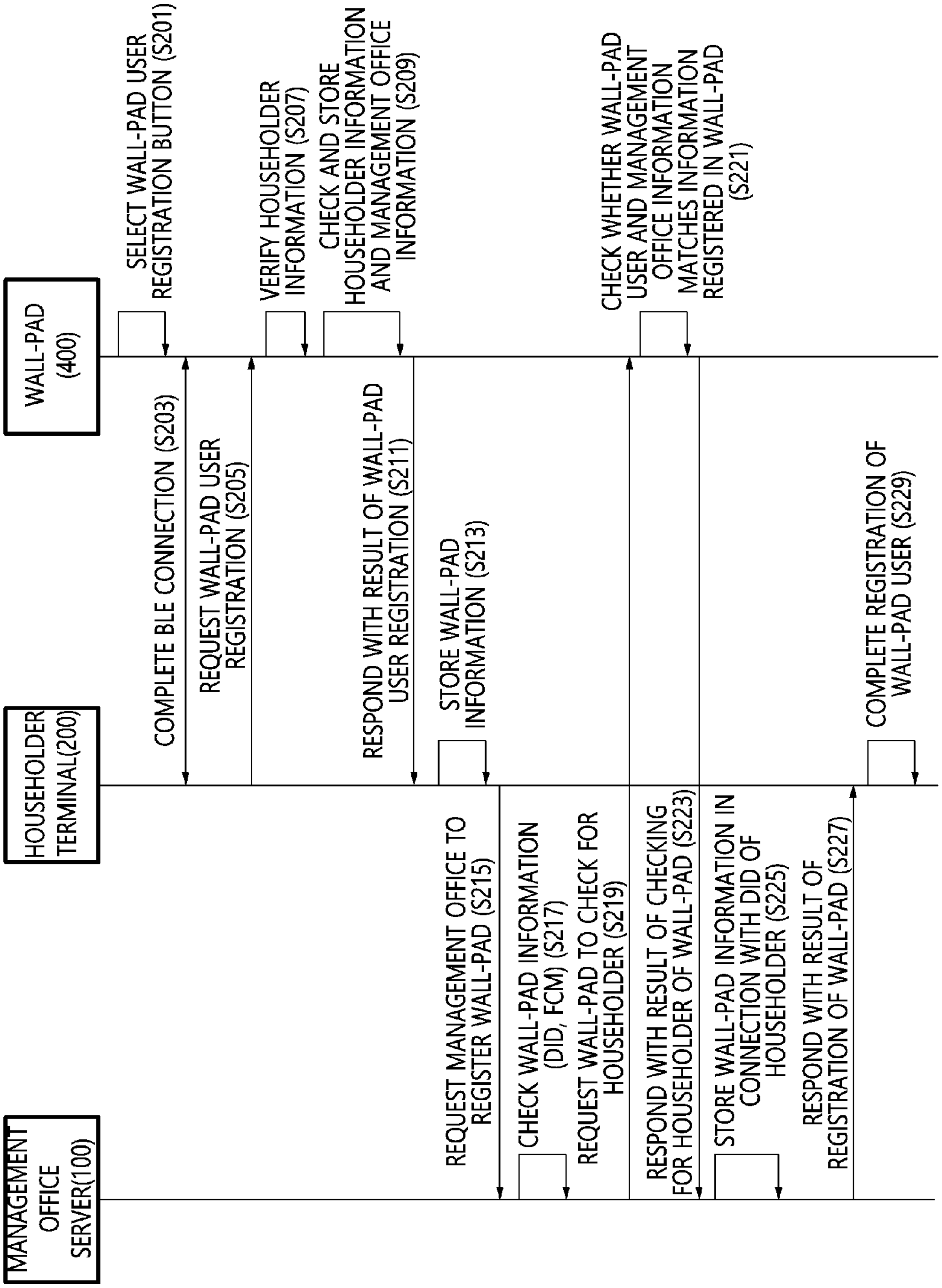
FIG. 6 is a flowchart illustrating a procedure for registering householder information in a wall-pad according to an embodiment.

FIG. 6 is a flowchart illustrating a procedure for registering householder information in a wall-pad according to an embodiment.

As illustrated in FIG. 6, when a user registration function of a wall-pad is executed by selecting a wall-pad user registration button based on the input by a householder, the wall-pad may start BLE advertising at step S201.

A householder terminal (a digital identity wallet) may check the BLE connection information of the wall-pad by activating a wall-pad scan function and complete connection at step S203. As the communication channel between the householder terminal and the wall-pad, any of various communication channels using not only BLE but also Wi-Fi, NFC, wired connection, and the like may be used.

When the BLE connection between the householder terminal and the wall-pad is completed, a request for wall-pad user registration may be made to the wall-pad at step S205. Information that is transmitted when wall-pad user registration is requested may include a digital certificate and management office information. The management office information may include visitor registration and cancellation URL information of the management office.

The wall-pad may verify the content and digital signature of the digital certificate and check household information and the decentralized identifier (DID) information of the management office at step S207. The household information may include the DID of the householder, the identifier of the digital certificate (the ID of the VC), a household address, the name of a building to which the household pertains, and the like.

The wall-pad may store the checked household information, the DID of the management office, and the management office information at step S209.

The wall-pad may generate a response to the request for wall-pad user registration and transmit the same to the householder terminal at step S211. Wall-pad information may include the DID of the wall-pad, information about a push service through which a message can be transmitted to the wall-pad, BLE UUIDs for terminals managed by the wall-pad, and a permission list.

The response may include the wall-pad information that is digitally signed with a private key associated with the DID of the wall-pad, whereby a function for ensuring integrity and non-repudiation of the wall-pad information may be provided.

The householder terminal may verify the response and check and store the wall-pad information at step S213.

The householder terminal may request the management office to register the wall-pad information of the householder at step S215. The wall-pad registration request information may include the wall-pad information and information acquired by signing the wall-pad information with the private key of the householder terminal.

A management office server may verify a wall-pad registration request form and check the DID information of the digital signatory and the wall-pad information at step S217. Also, the management office server may check whether the DID of the digital signatory is the DID of the householder registered in the management office, and may cause an error when the DID is not registered as the DID of the householder.

The management office server may check the push service information of the wall-pad in the wall-pad information and request the corresponding wall-pad to check for the householder at step S219. The request to check for the householder of the wall-pad may include the DID information of the householder and a digital signature value acquired by signing the request with a private key associated with the DID of the management office.

The wall-pad may verify the request to check for the householder of the wall-pad and check the DID information of the householder and the DID information of the management office. Then, the wall-pad may check whether the DID information of the householder and the DID information of the management office respectively match the DID information of the householder registered in the wall-pad and the DID information of the management office registered in the wall-pad at step S221.

The wall-pad may determine the result of checking for the householder of the wall-pad depending on whether the DIDs of the householder and management office match the registered DIDs of the householder and management office, and may respond with the result at step S223.

The management office server may check the result of checking for the householder of the wall-pad and store the wall-pad information in connection with the DID of the householder depending on the result at step S225.

The management office server may send the householder terminal the response to the wall-pad registration request at step S227.

The householder terminal may check the response and complete the wall-pad user registration depending on the response at step S229.

Figure 7:
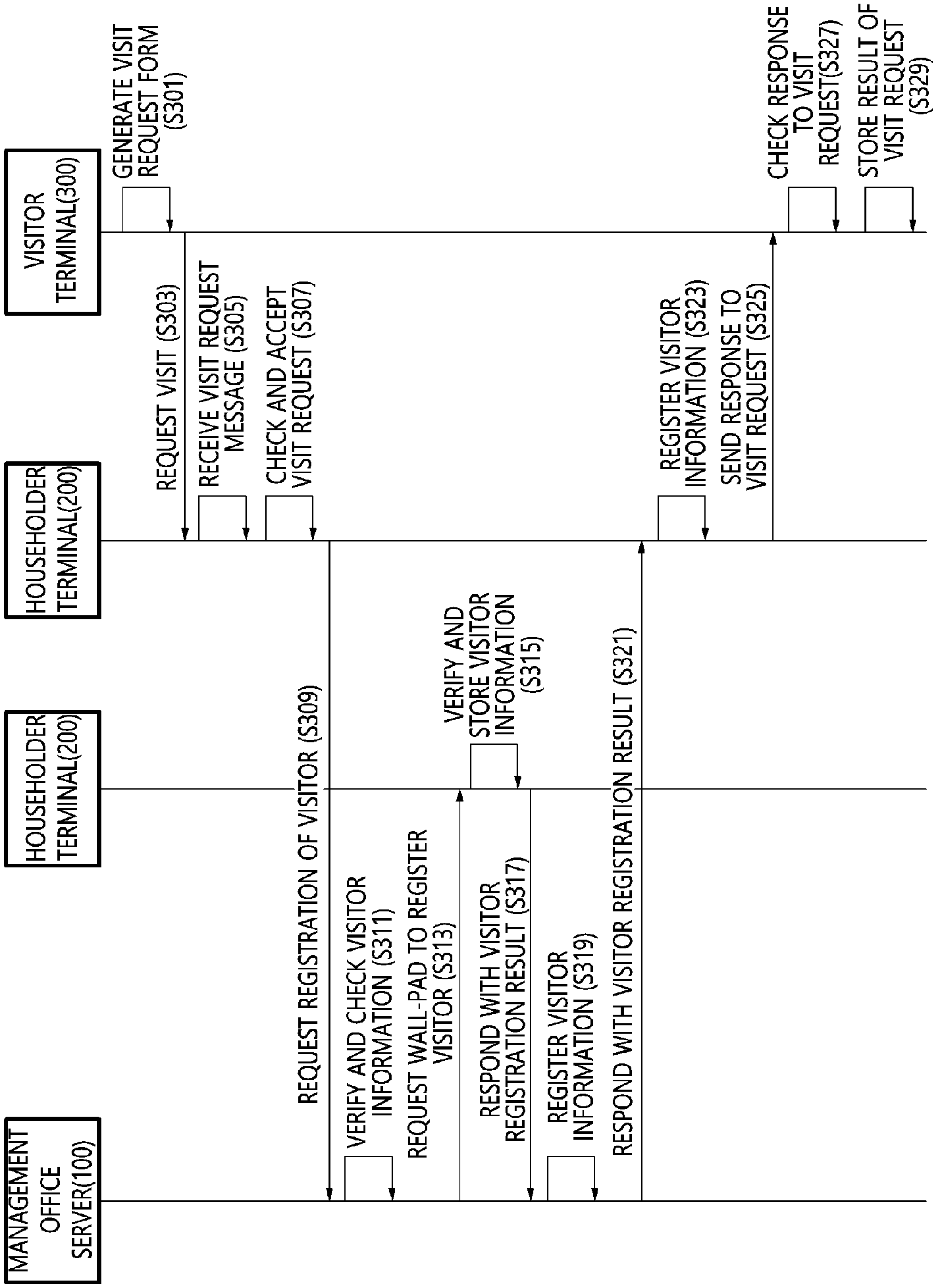
FIG. 7 is a flowchart illustrating a procedure in which a visitor makes a visit request to a householder according to an embodiment.

FIG. 7 is a flowchart illustrating a procedure in which a visitor makes a visit request to a householder according to an embodiment.

As illustrated in FIG. 7, a visitor terminal (a digital identity wallet) may generate a visit request form based on the input by a visitor at step S301. Here, the visit request form may include a session ID, the date and time at which the visitor is scheduled to arrive, the date and time at which the visitor is scheduled to leave, a vehicle plate number, the purpose of the visit, and a digital certificate capable of proving the identity of the visitor. For example, the digital certificate may include a mobile driver's license, a digital student identification, and a digital employee identification.

The session ID may be an ID for managing a session for the entire visit service, including a visit request, acceptance, cancellation, and the like. The session ID may be managed in a householder terminal, a management office server, and a wall-pad, which accept the visit, as well as in the visitor terminal.

The visitor terminal transmits the visit request form based on the input by the visitor to the householder terminal, thereby requesting the visit at step S303. The visit request form may be transmitted using a service channel supported by the digital identity wallet. In this case, the householder terminal and the visitor terminal have to use the same digital identity wallet service. When the householder terminal and the visitor terminal use different digital identity wallet services, visit request and response messages may be written in a MIME type interpretable by the digital identity wallet and attached to an external communication (a text message or an SNS), thereby being transmitted.

The householder terminal may receive the visit request message at step S305. Here, a list of various applications capable of interpreting the MIME type for the visit request message may be displayed, and the householder terminal may select a digital identity wallet to be used to check the visit request message.

The householder terminal may verify the visit request form using the digital identity wallet and check the content of the visit request at step S307. The householder terminal may check the identity of the visitor by verifying the digital certificate. The householder terminal may selectively accept different types of a visit depending on the purpose of the visit request. The types of a visit may be categorized into entry into a facility (an apartment building) and a visit to a household. In the case of the entry into a facility, a visitor is permitted to access the entrance of an apartment building only, and in the case of the visit to a household, a visitor is permitted not only to access the entrance of the apartment building but also to enter the front door of the household and use a home device.

The householder terminal may generate a visitor registration request form based on the input by a householder and request the management office server to register the visitor. The visitor registration request form may include the type of the visit, a visitor ID, the nickname of the visitor, the start date and time of the visit, the end date and time of the visit, the plate number of a visiting vehicle, the decentralized identifier (DID) of the householder, and the DID of the wall-pad of the householder, and may further include a digital signature for the visitor registration request form.

The visitor ID in the visitor registration request form may be set differently depending on the type of the visit. When the type of the visit is 'entry into a facility', the ID of the digital certificate submitted by the visitor at the time of requesting the visit may be set as the visitor ID.

When the type of the visit is 'a visit to a household', the ID of the digital certificate issued to the visitor terminal by the householder terminal may be set as the visitor ID.

The management office server may verify the digital signature of the digital certificate for the visitor registration request form and check whether the DID of the signatory is the DID of the registered householder at step S311. Then, the management office server may check the DID of the wall-pad, which is stored in connection with the DID of the householder, and may check whether the checked DIDs of the wall-pad and householder match the DIDs of the wall-pad and householder in the visitor registration request form.

When the checked DIDs of the wall-pad and householder match the DIDs of the wall-pad and householder in the visitor registration request form, the push service information of the wall-pad of the householder may be checked.

The management office server may request the wall-pad to register the visitor using the push service information of the wall-pad at step S313. The request to register the visitor may include the type of the visit, the visitor ID, the nickname of the visitor, the start date and time of the visit, the end date and time of the visit, the DID of the householder, and the DID of the management office, and may further include the digital signature of the management office for the request.

The wall-pad may verify the digital signature for the request to register the visitor and check whether the DID of the signatory matches the DID of the management office registered in the wall-pad and whether the DID of the householder in the request matches the DID of the householder registered in the wall-pad. When the DIDs in the request match the DIDs registered in the wall-pad, the wall-pad may store the visitor information at step S315.

The wall-pad may transmit the visitor registration result to the management office server at step S317.

The management office server may check the visitor registration result received from the wall-pad and register the visitor information at step S319.

The management office server may transmit the visitor registration result to the householder terminal at step S321.

The householder terminal may check the visitor registration result and register the visitor information at step S323. The householder terminal may generate a response to the visit request and transfer the same to the visitor terminal at step S325. The response to the visit request may include the session ID of the visit request form, the DID of the visitor, the DID of the householder, the visitor ID, the type of the visit, the purpose of the visit, an address, address details, the vehicle plate number, the start date and time of the visit, the end date and time of the visit, a list of BLE UUIDs of wall-pad management terminals, and the like.

Also, when the type of the visit is 'a visit to a household', the response may include digital certificate information issued by the householder terminal. The response to the visit request may also include the digital signature of the digital identity wallet of the householder. The method of transmitting the response may include a text message method and an SNS method.

The visitor terminal may verify the digital signature of the digital certificate for the response and verify the session ID, thereby checking whether the response is the result of the visit request made by the visitor at step S327.

The visitor terminal may check the result of the visit request and store and manage the same at step S329.

Figure 8:
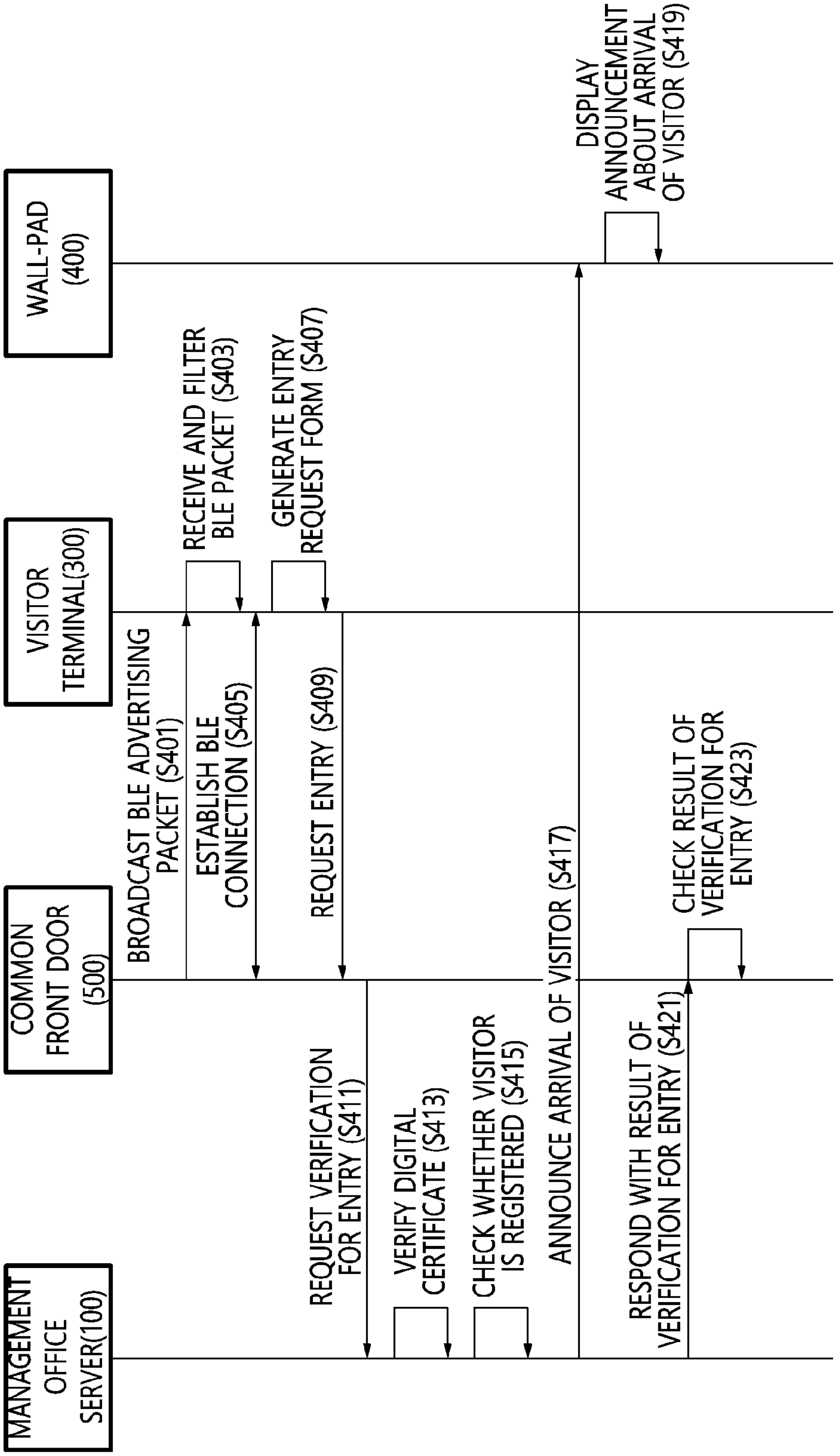
FIG. 8 is a flowchart illustrating a procedure in which a visitor accesses a common front door when a visit type is 'entry into a facility' according to an embodiment.

FIG. 8 is a flowchart illustrating a procedure in which a visitor enters a common front door when the type of a visit is 'entry into a facility' according to an embodiment.

As illustrated in FIG. 8, a common front door, which is a management-office management terminal, may always broadcast a BLE advertising message at step S401.

When it comes close to the common front door, a visitor terminal may receive the BLE advertising message of the common front door and check whether the BLE UUID information of the common front door matches a previously registered BLE UUID of the facility to visit at step S403.

When the BLE UUID of the common front door is the registered UUID, the visitor terminal requests a BLE connection and establishes a BLE communication channel with the common front door, thereby being connected with the common front door at step S405.

The visitor terminal may retrieve a digital certificate associated with the BLE UUID of the common front door and generate an entry request form at step S407. The entry request form may include a Verifiable Presentation (VP) for the digital certificate.

The visitor terminal may transmit the entry request form to the common front door using the BLE communication channel at step S409.

The common front door checks the entry request form, generates an entry verification request form, and transmits the same to a management office server at step S411. The entry verification request form may include the entry request form submitted by the visitor.

The management office server may verify the VP of the entry request form, the signature for the digital certificate, and the state of the digital certificate, and may check the ID information of the digital certificate (the ID of the VC), which is a visitor ID, at step S413.

Using the identified visitor ID, the management office server may check whether the visitor is registered and whether the visitor is a householder at step S415.

The management office server checks householder information associated with the visitor ID, thereby checking the push service information of the wall-pad of the householder. Then, the management office server announces the arrival of the visitor to the wall-pad. For example, a visitor's image captured at the common front door may be transferred, and the entry of the visitor or the householder may be announced at step S417.

The wall-pad may display the content of the announcement about the arrival of the visitor, which is received from the management office server, at step S419.

The management office server may send the common front door the result of verification for the entry of the visitor at step S421.

The common front door may open depending on the result of verification for the entry at step S423.

Figure 9:
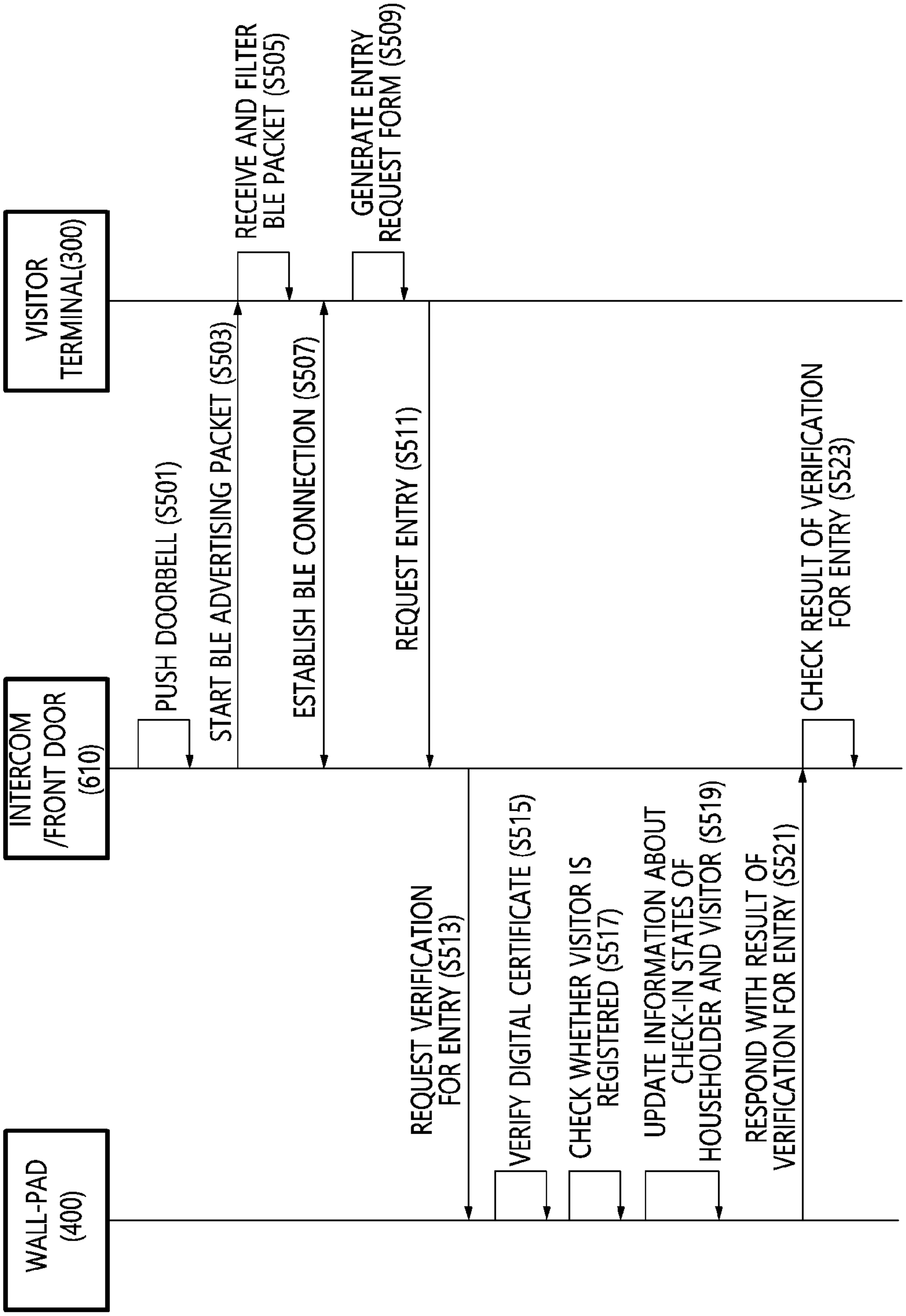
FIG. 9 is a flowchart illustrating a procedure in which a visitor enters the front door of a household when a visit type is 'a visit to a household' according to an embodiment.

FIG. 9 is a flowchart illustrating a procedure in which a visitor accesses the front door of a household when the type of a visit is 'a visit to a household' according to an embodiment.

As illustrated in FIG. 9, doorbell push information of an intercom, which is a wall-pad management terminal, may be generated based on the input by a visitor at step S501. The intercom may start a BLE advertising message at step S503.

A visitor terminal may receive the BLE advertising message of the intercom and check whether the BLE UUID information of the intercom is a previously registered BLE UUID of the facility to visit at step S505.

When the BLE UUID of the intercom is the registered UUID, the visitor terminal requests a BLE connection and establishes a BLE communication channel with the intercom at step S507.

The visitor terminal may retrieve a digital certificate associated with the BLE UUID of the intercom and generate an entry request form at step S509. The entry request form may include a verifiable presentation (VP) for the digital certificate.

The visitor terminal may transmit the entry request form to the intercom using the BLE communication channel at step S511.

The intercom checks the entry request form, generates an entry verification request form, and transmits the same to a wall-pad at step S513. The entry verification request form may include the entry request form submitted by the visitor.

The wall-pad may verify the VP of the entry request form, the signature for the digital certificate, and the state of the digital certificate, and may check the ID information of the digital certificate (the ID of the VC), which is a visitor ID, at step 515.

Using the identified visitor ID, the wall-pad may check whether the visitor is registered and whether the visitor is a householder at step S517.

Depending on whether the visitor ID is registered as a visitor or a householder, the wall-pad may update the check-in state of the householder and permission to use a home device at step S519. When the visitor ID corresponds to a householder, the check-in state of the householder is activated, whereby the permission to use all home devices may change according to a preset policy. When the visitor ID corresponds to a visitor, whether to permit the entry and the content of settings about the permission to use the home devices may change depending on whether or not the digital certificate is a digital certificate delegated by a householder.

When the digital certificate is not a digital certificate delegated by the householder, it is impossible to enter the household and to use the home devices, and information about whether the visitor is a registered visitor may be displayed on the wall-pad. However, when the digital certificate is a digital certificate delegated by the householder, the front door of the household may open and the permission to use the home devices may be set based on the delegated permission in the digital certificate.

The wall-pad may send the intercom the result of verification for the entry of the visitor at step S521. The intercom may open the front door of the household depending on the result of verification for the entry at step S523.

Figure 10:
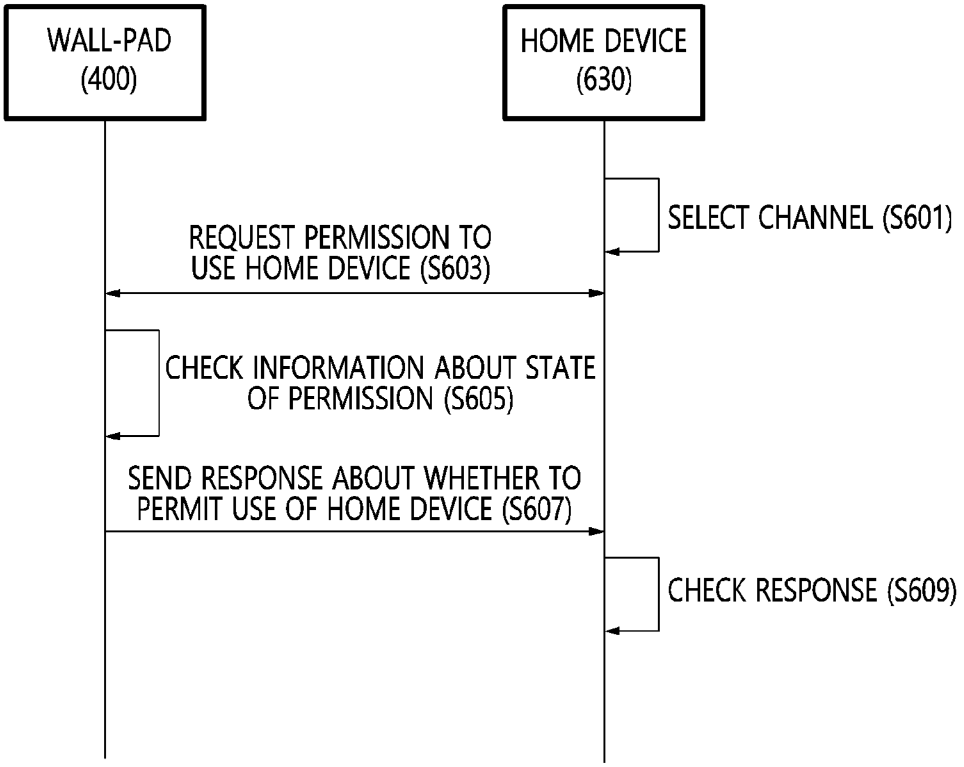
FIG. 10 is a flowchart illustrating a procedure for using a home device according to an embodiment.

FIG. 10 is a flowchart illustrating a procedure for using a home device according to an embodiment.

As illustrated in FIG. 10, when a visitor needs permission to use a home device in the state in which the home device (e.g., a TV) is turned on at step S601, the permission to use the home device may be requested from a wall-pad at step S603.

The wall-pad may check the state of the permission to use the home device at this point at step S605. The state of the permission to use the home device may change depending on the check-in state of a householder.

When the check-in state of the householder is activated, the content of a preset configuration about the permission to use the home device may be retrieved. When the check-in state of the householder is deactivated, a policy defining the permission to use a home device in the digital certificate, which is submitted by the visitor when the visitor enters the household, may be retrieved.

The wall-pad may send a response about whether to permit the use of the home device using the retrieved permission to use the home device at step S607.

The home device may be controlled depending on the response at step S609.

Figure 11:
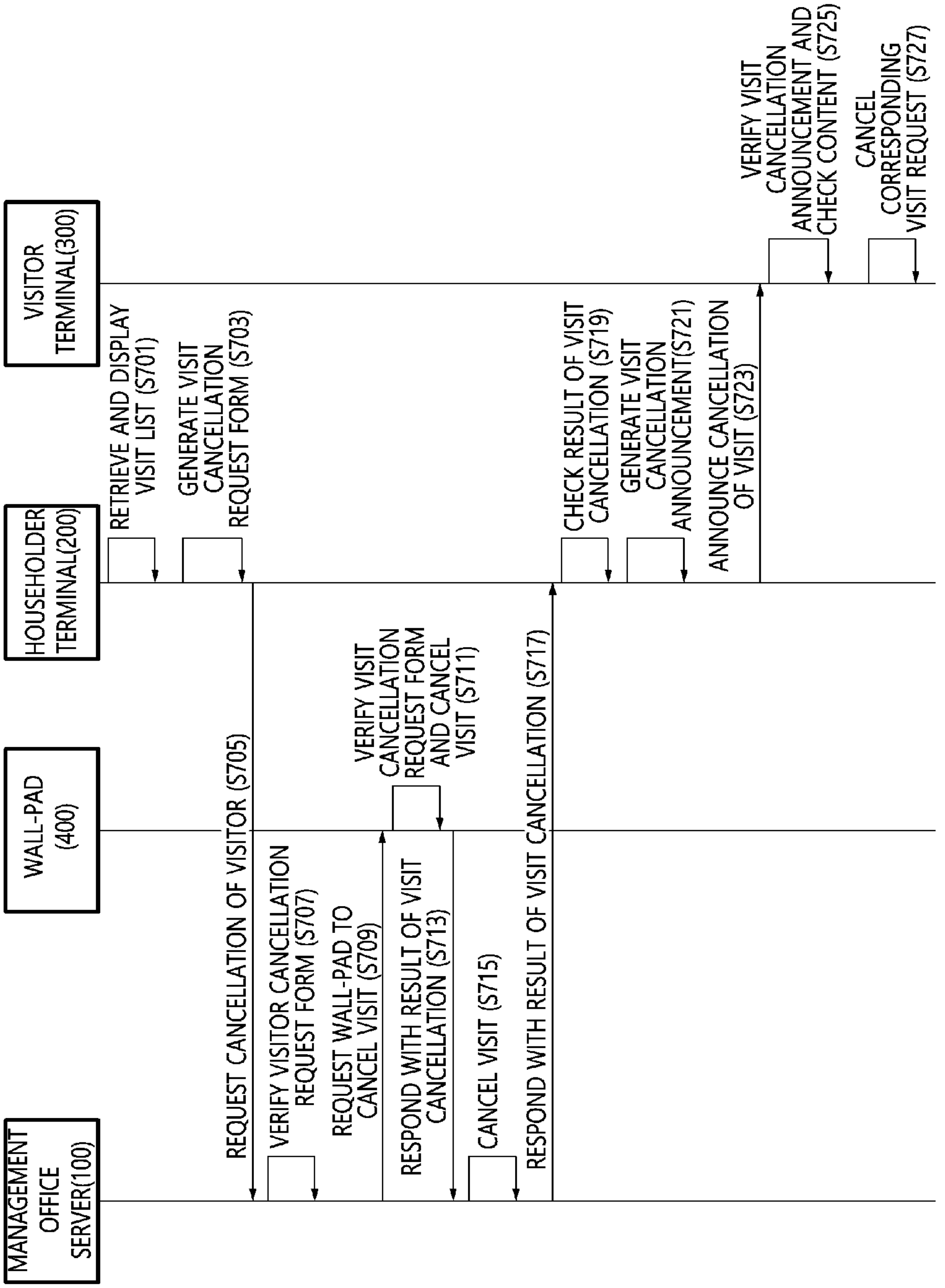
FIG. 11 is a flowchart illustrating a procedure in which a householder cancels visitor information according to an embodiment.

FIG. 11 is a flowchart illustrating a procedure in which a householder cancels visitor information according to an embodiment.

As illustrated in FIG. 11, a householder terminal may retrieve a list of visitors whose requests for a visit are accepted from a visit request service of a digital identity wallet based on the input by a householder and select information of the visitor whose visit is to be canceled at step S701.

The householder terminal may generate a visit cancellation request form using the information of the visitor whose visit is to be cancelled at step S703. The visit cancellation request form may include the session ID to be cancelled, a visitor ID, the decentralized identifier (DID) of the householder, the DID of the wall-pad of the householder, and the digital signature of the digital identity wallet for the visit cancellation request form.

The householder terminal may transmit the visit cancellation request form to a management office server at step S705.

The management office server verifies the digital signature for the visit cancellation request form and checks the information of the visitor whose visit is to be cancelled. Then, the management office server may retrieve the registered visitor information based on the session ID and check whether the content of the visit cancellation request form matches the retrieved content at step S707.

The management office server may generate a visit cancellation request form for the wall-pad and request the wall-pad to cancel the visit at step S709. The visit cancellation request form for the wall-pad may include the session ID to be cancelled, the visitor ID, the DID of the householder, the DID of the management office, and the digital signature of the management office server for the visit cancellation request form.

The wall-pad verifies the digital signature for the visit cancellation request form and checks the information of the visitor whose visit is to be cancelled at step S711. Then, the wall-pad retrieves the registered visitor information based on the session ID and checks whether the content of the request form matches the retrieved content. When the content of the request form matches the retrieved content, the visitor information may be deleted.

The wall-pad may transmit a visit cancellation result to the management office server at step S713.

The management office server may delete the visitor information depending on the visit cancellation result at step S715.

The management office server may transmit the visitor cancellation result to the householder terminal at step S717.

The householder terminal may delete the visitor information depending on the visit cancellation result at step S719.

The householder terminal may generate a visit cancellation announcement to transmit to the visitor at step S721. The visit cancellation announcement may include the cancelled session ID, the visitor ID, the DID of the householder, and the digital signature of the digital identity wallet of the householder for the visit cancellation announcement.

The householder terminal may transmit the visit cancellation announcement to the visitor terminal using a text message or an SNS method at step S723.

The visitor checks the visit cancellation announcement message through the visitor terminal and selects a digital identity wallet capable of interpreting a MIME type for the visit cancellation announcement message, thereby checking the content thereof at step S725.

The visitor terminal may delete the visitor information corresponding to the content of the visit cancellation announcement based on the input by the visitor at step S727.

In the above example, the entity to cancel the visit information may be any of the householder, the visitor, the management office, and the wall-pad, and the visit may be cancelled based on the session ID.

The respective components of the visitor access management system according to an embodiment may be implemented in a computer system including a computer-readable recording medium.

Figure 12:
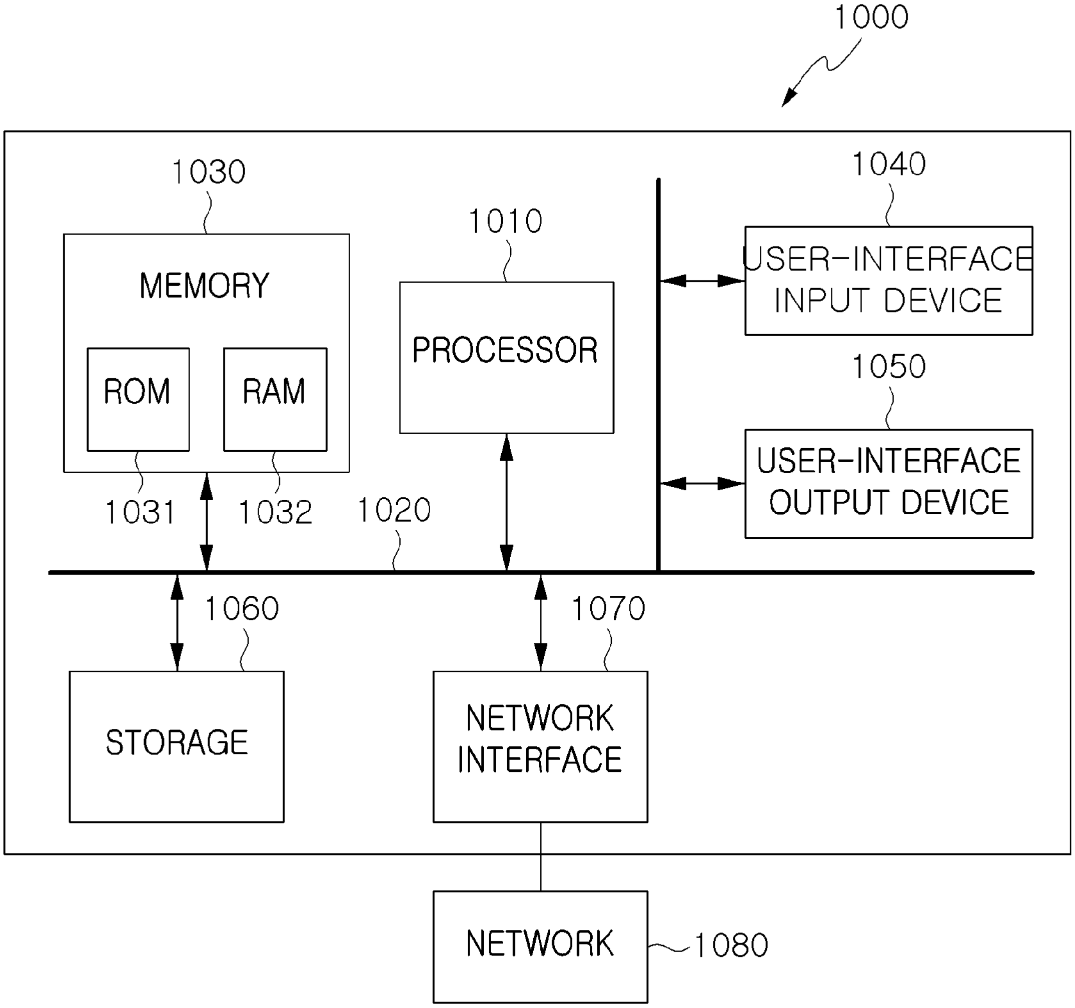
FIG. 12 is a block diagram illustrating the configuration of a computer system according to an embodiment.

FIG. 12 is a block diagram illustrating the configuration of a computer system according to an embodiment.

Referring to FIG. 12, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing the operation of the respective components according to an embodiment. Specifically, the memory may store multiple applications, data and instructions.

The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

An embodiment enables a visitor to enter a household and use various devices during a certain period of time by delegating a digital certificate to the visitor, thereby minimizing inconvenience of residents.

Also, an embodiment grants a visit and the use of devices by delegating a digital certificate to a visitor, thereby improving security related to entry and permission to use the devices.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device.

Also, unless specific terms, such as “essential”, “important”, or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for user-centered visitor access management, comprising:

issuing, by a management office server, a digital certificate to a householder terminal;

registering, by a wall-pad, a householder in response to a request to register the householder based on the digital certificate;

delegating, by the householder terminal, the digital certificate to a visitor terminal in response to a visit request from the visitor terminal and requesting, by the householder terminal, the management office server to register a visitor based on the delegated digital certificate;

making, by the visitor terminal, an entry request to a management terminal based on the digital certificate;

when the management terminal is a wall-pad management terminal, verifying, by the wall-pad, the digital certificate in response to a request for verification for entry from the wall-pad management terminal and providing, by the wall-pad, a result of the verification to the wall-pad management terminal; and managing and controlling, by the wall-pad, permission to use a home device based on delegated permission information of the digital certificate, wherein the householder terminal requests the management office server to register the digital certificate after verifying content of the received digital certificate and checking service attribute information, which includes a list of Bluetooth Low Energy(BLE) identifier information for management-office management terminals, in a decentralized identifier document of a management office.

2. The method of claim 1, wherein issuing the digital certificate includes:

generating the digital certificate after checking identification of the householder;

transmitting the digital certificate to the householder terminal through a communication channel;

registering the digital certificate in response to a registration request from the householder terminal; and transmitting a result of registration of the digital certificate to the householder terminal.

3. The method of claim 2, wherein the householder terminal stores the digital certificate and management office information based on the result of the registration of the digital certificate.

4. The method of claim 1, wherein managing and controlling, by the wall-pad, the permission to use the home device includes:

checking whether a visitor Identifier (ID) corresponds to the householder or the visitor using the visitor ID;

checking whether the digital certificate is the digital certificate delegated by the householder terminal when the visitor ID corresponds to the visitor; and changing a configuration about the permission to use the home device such that the visitor is able to use the home device when the digital certificate is the digital certificate delegated by the householder terminal.

5. The method of claim 1, wherein, when the management terminal is a management-office management terminal, the management office server verifies the digital certificate in response to a request for verification for entry from the management-office management terminal and provides a result of the verification to the management-office management terminal.

6. The method of claim 1, wherein making the entry request to a management-office management terminal includes:

checking whether a Bluetooth Low Energy Universally Unique Identifier (BLE UUID) of the management-office management terminal is a BLE UUID of a previously registered facility to visit;

when the BLE UUID of the management-office management terminal is the BLE UUID of the previously registered facility to visit, establishing a BLE communication channel with the management-office management terminal;

retrieving the digital certificate associated with the BLE UUID of the management-office management terminal and generating an entry request form based on the digital certificate; and making the entry request to the management-office management terminal based on the entry request form.

7. A method for user-centered visitor access management, comprising:

issuing, by a management office server, a digital certificate to a householder terminal;

registering, by a wall-pad, a householder in response to a request to register the householder based on the digital certificate;

delegating, by the householder terminal, the digital certificate to the visitor terminal in response to a visit request from a visitor terminal and requesting, by the householder terminal, the management office server to register a visitor based on the delegated digital certificate;

making, by the visitor terminal, an entry request to a management terminal based on the digital certificate;

when the management terminal is a wall-pad management terminal, verifying, by the wall-pad, the digital certificate in response to a request for verification for entry from the wall-pad management terminal and providing, by the wall-pad, a result of the verification to the wall-pad management terminal; and managing and controlling, by the wall-pad, permission to use a home device based on delegated permission information of the digital certificate, wherein making the entry request to the wall-pad management terminal includes:

checking whether a Bluetooth Low Energy Universally Unique Identifier (BLE UUID) of the wall-pad management terminal is a BLE UUID of a previously registered facility to visit;

when the BLE UUID of the wall-pad management terminal is the BLE UUID of the previously registered facility to visit, establishing a BLE communication channel with the wall-pad management terminal;

retrieving the digital certificate associated with the BLE UUID of the wall-pad management terminal and generating an entry request form based on the digital certificate; and making the entry request to the wall-pad management terminal based on the entry request form.

8. The method of claim 7, wherein the wall-pad management terminal generates an entry verification request form based on the entry request form and makes a request for verification for entry to the wall-pad based on the entry verification request form.

9. The method of claim 7, wherein the entry request form includes a verifiable presentation for the digital certificate.

10. A system for user-centered visitor access management, comprising:

a management office server for issuing a digital certificate to a householder terminal;

a wall-pad for registering a householder in response to a request to register the householder based on the digital certificate;

the householder terminal for delegating the digital certificate to a visitor terminal in response to a visit request from the visitor terminal and requesting the management office server to register a visitor based on the delegated digital certificate; and the visitor terminal for making an entry request to a management terminal based on the digital certificate, wherein when the management terminal is a wall-pad management terminal, the wall-pad verifies the digital certificate in response to a request for verification for entry from the wall-pad management terminal and provides a result of the verification to the wall-pad management terminal, and the wall-pad manages and controls permission to use a home device based on delegated permission information of the digital certificate, and wherein the householder terminal requests the management office server to register the digital certificate after verifying content of the received digital certificate and checking service attribute information, which includes a list of BLE identifier information for management-office management terminals, in a decentralized identifier document of a management office.

11. The system of claim 10, wherein the management office server generates the digital certificate after checking identification of the householder, transmits the digital certificate to the householder terminal through a communication channel, registers the digital certificate in response to a registration request from the householder terminal, and transmits a result of registration of the digital certificate to the householder terminal.

12. The system of claim 11, wherein the householder terminal stores the digital certificate and management office information based on the result of the registration of the digital certificate.

13. The system of claim 10, wherein the visitor terminal checks whether a Bluetooth Low Energy Universally Unique Identifier (BLE UUID) of the wall-pad management terminal is a BLE UUID of a previously registered facility to visit, establishes a BLE communication channel with the wall-pad management terminal when the BLE UUID of the wall-pad management terminal is the BLE UUID of the previously registered facility to visit, retrieves the digital certificate associated with the BLE UUID of the wall-pad management terminal, generates an entry request form based on the digital certificate, and makes the entry request to the wall-pad management terminal based on the entry request form.

14. The system of claim 13, wherein the wall-pad management terminal generates an entry verification request form based on the entry request form and makes a request for verification for entry to the wall-pad based on the entry verification request form.

15. The system of claim 13, wherein the entry request form includes a verifiable presentation for the digital certificate.

16. The system of claim 10, wherein the wall-pad checks whether a visitor Identifier (ID) corresponds to the householder or the visitor using the visitor ID, checks whether the digital certificate is the digital certificate delegated by the householder terminal when the visitor ID corresponds to the visitor, and changes a configuration about the permission to use the home device such that the visitor is able to use the home device when the digital certificate is the digital certificate delegated by the householder terminal.

17. The system of claim 10, wherein, when the management terminal is a management-office management terminal, the management office server verifies the digital certificate in response to a request for verification for entry from the management-office management terminal and provides a result of the verification to the management-office management terminal.

18. The system of claim 10, wherein the visitor terminal checks whether a Bluetooth Low Energy Universally Unique Identifier (BLE UUID) of a management-office management terminal is a BLE UUID of a previously registered facility to visit, establishes a BLE communication channel with the management-office management terminal when the BLE UUID of the management-office management terminal is the BLE UUID of the previously registered facility to visit, retrieves the digital certificate associated with the BLE UUID of the management-office management terminal, generates an entry request form based on the digital certificate, and makes the entry request to the management-office management terminal based on the entry request form.

* * * * *